US012450378B2

(12) United States Patent
Gowda et al.

(10) Patent No.: US 12,450,378 B2
(45) Date of Patent: Oct. 21, 2025

(54) CREATOR-PROTECTED COPIES IN STORAGE SYSTEMS

(71) Applicant: Dell Products L.P., Round Rock, TX (US)

(72) Inventors: Shivasharan Narayana Gowda, Kolar (IN); Balasundaram Govindan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 318 days.

(21) Appl. No.: 17/986,097

(22) Filed: Nov. 14, 2022

(65) Prior Publication Data

US 2024/0160759 A1 May 16, 2024

(51) Int. Cl.
*G06F 21/62* (2013.01)
*G06F 21/60* (2013.01)

(52) U.S. Cl.
CPC ........ *G06F 21/6218* (2013.01); *G06F 21/604* (2013.01); *G06F 2221/2141* (2013.01)

(58) Field of Classification Search
None
See application file for complete search history.

(56) References Cited

U.S. PATENT DOCUMENTS

| 8,620,879 | B2 * | 12/2013 | Cairns | G06F 16/1824 |
| | | | | 713/168 |
| 10,726,137 | B2 * | 7/2020 | Rodriguez Bravo | ....... |
| | | | | G06F 21/6209 |
| 11,216,568 | B2 * | 1/2022 | Acharya | H04L 9/3226 |
| 2008/0083037 | A1 * | 4/2008 | Kruse | G06F 21/88 |
| | | | | 726/27 |

* cited by examiner

*Primary Examiner* — Jeffrey R Swearingen
(74) *Attorney, Agent, or Firm* — Dergosits & Noah LLP; Todd A. Noah

(57) ABSTRACT

Creator-protected copies in storage systems are described. After receiving a command, from a user who is a creator of a copy of an object, to store the copy of the object and a corresponding keyword, the system stores the copy of the object and the corresponding keyword to a storage system. Following receipt of a command from a system user to perform an operation on the copy of the object, the system determines whether an access control model enables the system user to perform the operation on the copy of the object. If the access control model enables the system user to perform the operation on the copy of the object, and if the system user provides the keyword that corresponds to the copy of the object, then the system performs the operation on the copy of the object.

20 Claims, 3 Drawing Sheets

CREATOR-PROTECTED COPIES IN STORAGE SYSTEMS

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application performs a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to perform a restore operation to restore a copy of the corresponding backup file(s) for that previous state to the data object.

A data storage system may store a data object on a storage array, which may be a disk-based retention system that includes multiple disk drives. Unlike a disk enclosure, a storage array has cache memory and advanced functionality, such as virtualization and Redundant Array of Independent Disks (RAID). A data protection administrator can instruct a backup/restore application to create backups files of data objects and store the backup files of data objects on multiple storage arrays.

In computer security, an access control list (ACL) is a list of permissions that an access control model associates with a system resource, such as a copy of a data object. An access control list specifies which users or system processes are granted access to which copies of objects, as well as what operations are allowed to be performed on which copies of objects. Each entry in a typical access control list specifies an object and an operation. For example, if an access control model associates a copy of a file object with an access control list that contains (Amy: read, write; Dan: read), this access control model would give Amy permission to read and write the copy of the file object and give Dan permission only to read the copy of the file object.

The main alternative to the access control list model is the role-based access control model, which can restrict the use of computer resources based on organizational positions of the system resources' users. A role-based access control model creates specific roles for various positions within an organization, and assigns the permissions to perform specific operations on a computer system to the specific roles. The role-based access control model assigns specific roles to computer system users, and through these role assignments the users acquire the permissions needed to perform their specific operations. Since a role-based access control model does not directly assign permissions to system users to perform specific operations, the system users only acquire these permissions through their role assignments. Therefore, the management of a system user becomes a matter of simply assigning appropriate roles to users, which simplifies common administrative processes, such as adding a user or changing the organizational department of a user.

DETAILED DESCRIPTION

Figure 1:
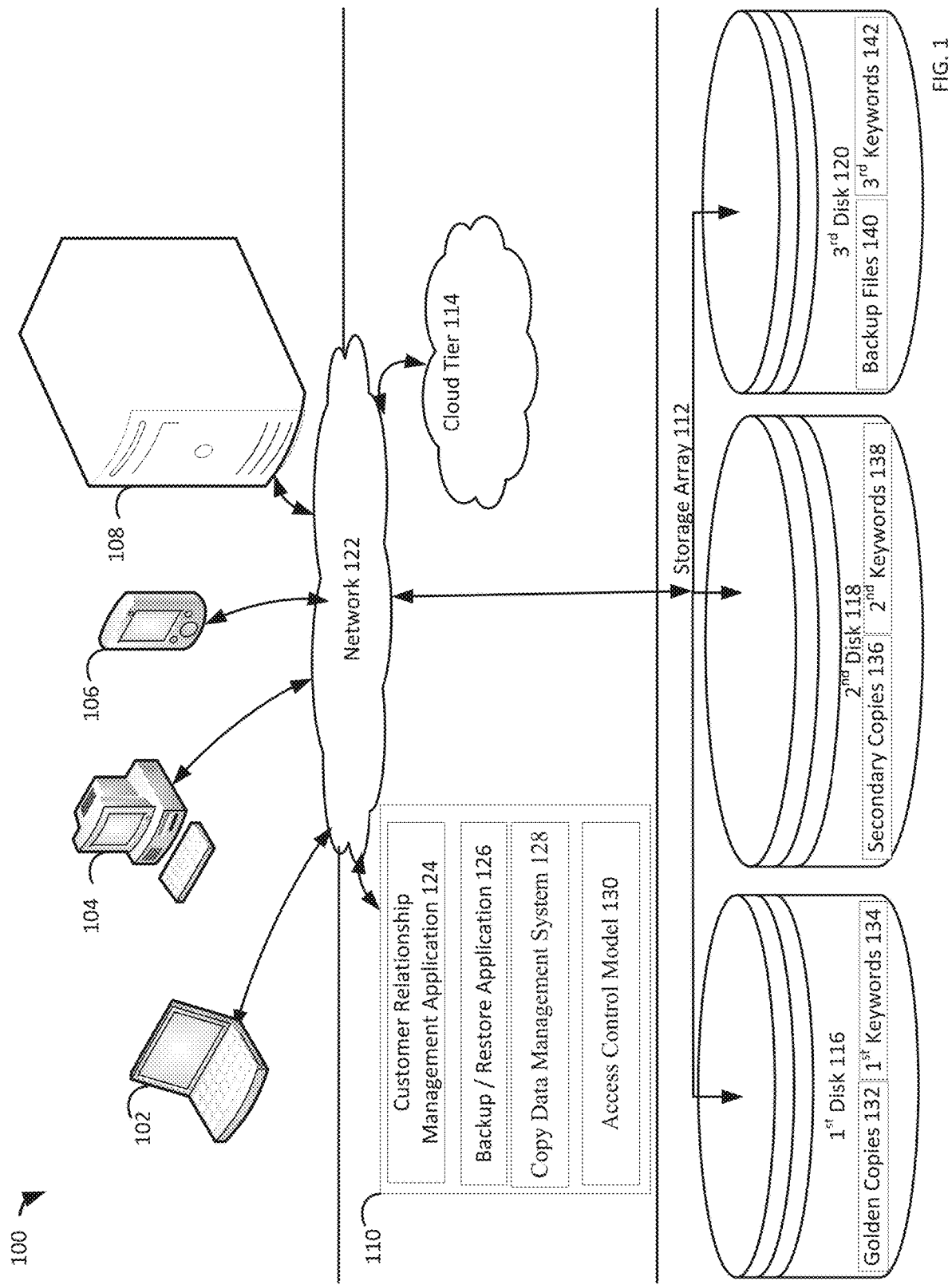
FIG. 1 illustrates a block diagram of an example system for creator-protected copies in storage systems, under an embodiment.

Currently, in typical enterprise storage systems, an authorized user can use Copy Data Management (CDM) software, such as Actifio Inc., AppSync, Catalogic Software, Cohesity Inc., Commvault Systems Inc., Delphix Corp., Power Protect Data Management, and Rubrik Inc. to create a copy/snapshot/clone of an object. Any user who is listed in the same access control list as the creator of the copy, or has the same access control role as the creator of the copy, can also access the copy and perform any operation on the copy, such as copying, duplicating, exporting, or deleting the copy. If an unauthorized user acquires the same storage system credentials as the creator of the copy, then any operation that the creator can perform on the copy can be performed by the unintended user via the Copy Data Management software. Additionally, an administrator user may easily override any access control limitations to access the copy created by the authorized user and perform any operation, such as copying, duplicating, exporting, or deleting the copy, without any verification or interaction with the creator of the copy. There is no easy way to limit the access to a copy or the subsequent use of the copy solely based on the creator of the copy.

Embodiments herein enable creator-protected copies in storage systems. After receiving a command, from a user who is a creator of a copy of an object, to store the copy of the object and a corresponding keyword, the storage system stores the copy of the object and the corresponding keyword. Following receipt of a command from a system user to perform an operation on the copy of the object, the system determines whether an access control model enables the system user to perform the operation on the copy of the object. If the access control model enables the system user to perform the operation on the copy of the object, and if the system user also provides the keyword that corresponds to the copy of the object, then the system performs the operation on the copy of the object.

For example, after receiving a command from a system user named Chris to store a golden copy of a customer relationship management (CRM) object which Chris created to store data about a customer named KCorp and a corresponding keyword KCorp@123, a storage array stores the golden copy of the KCorp CRM object and its keyword. Following receipt of a command from a system user named Karen to create a secondary copy of the golden copy of the KCorp CRM object in the storage array, the system determines whether an access control model enables Karen to create a secondary copy of golden copy of the KCorp CRM object in the storage system. If the access control model enables Karen to create a secondary copy of the golden copy of the KCorp CRM object in the storage array, and if Karen provides the keyword KCorp@123 for the golden copy of the KCorp CRM object, then the system enables Karen to create a secondary copy of the golden copy of KCorp CRM object in the storage array.

FIG. 1 illustrates a diagram of a system 100 for creator-protected copies in storage systems, under an embodiment. As shown in FIG. 1, the system 100 may illustrate a cloud computing environment in which data, applications, services, and other application resources are stored and delivered through shared data centers and appear as a single point of access for the users. The system 100 may also represent any other type of distributed computer network environment in which servers control the storage and distribution of application resources and services for different client users.

In an embodiment, the system 100 represents a cloud computing system that includes a first client 102, a second client 104, a third client 106, and a fourth client 108, and a server 110, a storage array 112, and a cloud tier 114 that may be provided by a hosting company. The storage array 112 may include a first disk 116, a second disk 118, and a third disk 120. The clients 102-108, the server 110, the storage array 112, and the cloud tier 114 communicate via a network 122. The server 110 can include a customer relationship management application 124, a backup/restore application 126, a copy data management system 128, and an access control model 130, while the first disk 116 can include golden copies 132 and a first set of keywords 134, the second disk 118 can include secondary copies 136 and a second set of keywords 138, and the third disk 120 can include backup files 140 and a third set of keywords 142.

FIG. 1 depicts the system 100 with four clients 102-108, one server 110, one storage array 112, one cloud tier 114, three disks 116-120, one network 122, one customer relationship management application 124, one backup/restore application 126, one copy data management system 128, one access control model 130, one set of golden copies 132, one set of secondary copies 136, one set of backup files 140, and three sets of keywords 134, 138, and 142. However, the system 100 may include any number of clients 102-108, any number of servers 110, a number of storage arrays 112, any number of cloud tiers 114, and any number of disks 116-120, any number of networks 122, any number of customer relationship management applications 124, any number of backup/restore applications 126, any number of copy data management systems 128, any number of access control models 130, any number of sets of golden copies 132, any number of sets of secondary copies 136, any number of sets of backup files 140, and any number of sets of keywords 134, 138, and 142. The clients 102-108 and the server 110, may each be substantially similar to the system 300 depicted in FIG. 3 and described below.

Although FIG. 1 depicts the first client 102 as a laptop computer 102, the second client 104 as a personal computer 104, the third client 106 as a smartphone 106, and the fourth client 108 as a server 108, each of the clients 102-108 may be any type of computer. Although FIG. 1 depicts the copy data management system 128 and the access control model 130 residing on the server 110, the copy data management system 128 and the access control model 130 may reside partially on the server 110 and partially on the clients 102-108, and partially on another server or completely on another server, which is not depicted by FIG. 1. Furthermore, the access control model 130 may be any type of an access control model or any combination of access control models, such as the access control list model and/or the role-based access control model described above.

The server 110, which may be referred to as a backup server 110, can include the backup/restore application 126 that creates backup files of data objects for the clients 102-108, and can perform a restore operation based on the backup files stored on the storage array 112. The backup/restore application 126 provides centralized administration, such as scheduling, monitoring, and managing backup operations and backup files. The backup/restore application 126 enables the storing of backup operation schedules, client policies, and client configurations. The backup/restore application 126 provides a unique interface to the clients 102-108 during login, and assists the server 110 in authenticating and registering the clients 102-108.

The backup/restore application 126 can send backup/restore work orders to the clients 102-108, which may receive and process the work orders to start a backup or restore operation. The backup/restore application 126 can maintain a local database of all processes that execute on the backup server 110. The backup/restore application 126 may execute server-side processes for a system administrator's graphical management console, which may enable the system administrator to use command line interface tools for queries. For example, a system administrator identifies the clients 102-108 registered with the backup server 110.

A system user can enter their user credentials, such as a username and password, to log into any of the client 102, 104, 106, or 108, and enter any number of commands for the copies of the objects stored on the storage array 112 by specifying which operations the system user intends to perform on the copies. The access control model 130 can verify that a command issued by the system user include an operation that the access control model 130 enables the system user to perform on a copy. However, if the system user did not provide the keyword corresponding to the copy specified by the command, then the system 100 can notify the user who created the copy that the system user wants to perform the operation on the copy of the object. Consequently, the creator of the copy can decide whether to enable the user to perform the operation on the copy of the object. The system 100 can identify the creator of the copy to prompt the creator to enable the performance of the operation on the copy of the object, and also determine the time when the operation specified by the system user's command should be performed, which may be based on the time normally required to perform the operation, and/or the times when the operation is normally performed, such as after midnight when the system's resource consumption is relatively low.

Subsequently, the system 100 can determine whether a user, who is the creator of the copy of the object specified by the system user's command to perform an operation on the copy of the object, has logged into the client 102, 104, 106, or 108, and whether the creator has decided to enable the system user to perform the operation specified by the command for the object. While determining that the creator has enabled the system user to perform an operation on the copy of the object in the first disk 116 in the storage array 112, the system 100 can verify the identity of the system user who issued the command for the copy of the object and the identity of the user who responded with permission which enables the performance of the operation on the copy of the object. The username and password which a system user enters to login to any of the clients 102-108 to issue a command to perform an operation on a copy stored on the storage array 112, the username and password which a creator of the copy enters to login to any of the clients 102-108 to give permission which enables the system user to perform any operation on the copy of the object, and the username and password which the system user may enter in a login page for the storage array 112, collectively enable the system 100 to verify the identities of the participating users.

When a user initiates the creation of a copy of an object, the storage array 112 can provide an option for the creator to supply a keyword while creating the copy. The creator can perform the create copy operation with a keyword option whenever the creator determines that creator-protection is needed for the copy of the object being created. For example, the creator enters the Command Line Interface command:

create copy-type=snapshot name=snap1 source=volume1 keyword=Pass@123

The storage array 112 can respond to the creator of a copy providing the keyword by creating the copy and storing the keyword provided by the creator as a metadata property for the created copy. For any subsequent operations, such as a clone, a copy, an export, a snapshot, or a delete operation, specified by a commanded issued by any user for any copy, if the keyword property of the copy specified by the operation is defined, then the storage array 112 expects the user who is currently attempting to access the copy to provide the keyword which the creator of the copy previously provided, via a command or an application programming interface (API). If the user who is issuing the command that identifies a copy of an object does not provide the keyword corresponding to the copy, the storage array 112 can select a response to the lack of the keyword being provided based on the various operations specified by the command for the copy and/or the various users of the storage array 112. For example, in response to a user failing to provide the keyword corresponding to the copy specified by the user's command, the storage array 112 may not perform any operation specified by the command.

Alternatively, if system users do not provide the keywords corresponding to the copies of the objects specified by the commands issued by the system users, and the storage array 112 determines that the access control model 130 enables the system users to perform operations on copies of objects stored in the storage array 112, then the storage array 112 can select from various response options. The first option that the storage array 112 can select is to enable the performance of the operation on the copy specified by the command if the user issuing the command is an administrator user or the creator of the copy. The second option that the storage array 112 can select is to determine whether the operation specified by the command is a delete operation, and determine whether such a delete operation would improve the situation when the storage array 112 has a remaining capacity that is less than a remaining capacity threshold of the storage array 112, such as less than 5% remaining storage capacity. In response to determining that such a remaining storage capacity for the storage array 112 is less than a minimum remaining capacity threshold, the storage array 112 has the option of enabling any system user who issues a command to delete a copy of an object to perform the deletion of the specified copy of the object.

The third option that the storage array 112 can select is to notify the creator who created the copy of the object specified by the command that a user issued the command to perform an operation on the copy of the object created by the creator. Details about how a system can generate notifications to the creator of a copy of an object, and enable responses by the creator to such notifications are described in co-pending U.S. patent application Ser. No. 17/189,441 filed Mar. 2, 2021, which is incorporated by reference herein in its entirety.

If the creator responds to such a notification with permission for the system user to perform the operation on the copy created by the creator, the storage array 112 can enable the user to perform the operation. The creator may respond to such a notification with permission by providing the keyword corresponding to the copy. However, if the creator does not respond to such a notification, such as by not providing the keyword in a single attempt or multiple attempts, the storage array 112 may not perform the operation.

In environments where copy data management software is deployed with multi-tenant/multi users, the system may use the keyword mechanism to control the operations at the granularity of a given source application or a target copy. In environments where a distinct copy data management software 128 is deployed, the system may use the keyword mechanism to temporarily allow access on specific copies, by using temporary keywords which will expire in limited time. In environments where a golden copy of a source and the copies of the golden copies (second-generation copies in copy re-purpose use cases) are created by one user (creator), and mapping of the second-generation copies is managed by different users (consumers) based on different use-cases, such as development operations (dev-ops), analytics, testing, etc., the creator can control which consumer may be allowed to perform what operation by sharing the keyword with the intended consumer. The storage system has various options in these environments for creator-protected copies, as described in detail further below.

This way, the copies are protected from the consumers on top of an access control list. The system 100 provides categorical control over the copies to the creator, instead of to the user/user-group/access control list. The system 100 can control the operations on a copy at the granularity of a source application or target copy. The system 100 can provide a system user with a way to operate on the user-created copies by interacting with the creator of a copy, or the creator's keyword.

Although the following paragraphs describe Dell Corporation's PowerProtect® backup/restore application, Dell Corporation's NetWorker® backup/restore application, and Dell Corporation's Avamar® backup/restore application as examples of the backup/restore application 126, the backup/restore application 126 may be any other type of backup/restore application which provides the backup/restore functionalities described in the Background section. The backup server 110 may be any other type of backup server which provides the backup/restore functionalities described in the Background section.

The backup/restore application 126 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances.

When superior performance is crucial, PowerProtect® Data Manager provides a direct path between Dell tier 1 storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 126 may be a Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups.

The core NetWorker® software backs up client file systems and operating system environments. Add-on database and application modules provide backup services for products such as Microsoft® Exchange Server. Client backup data may be sent to a remote NetWorker® storage node or stored on a locally attached device using a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 126 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic.

Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types.

The system 100 may include different policies for various data protection levels, such as a "gold" policy for VMware® clients, a "platinum" policy for UNIX® clients, and a "silver" policy for Windows® clients. The gold policy can specify to store 2 backup copies for each VMware® client's application resources onto the first disk for 6 months, store a primary clone of the backup copies onto the second disk for 1 year, and store a secondary clone of the backup copies onto a tape, which is not depicted in FIG. 1, for 5 years. In another example, a policy can provide redundancy by specifying to replicate each full backup copy to three different backups servers, replicate each incremental cumulative backup copy and each incremental differential backup copy to two different backup servers, replicate each archive log backup copy to one additional backup server, and relocate each full backup copy created at the end of the month to cloud tiering for long term retention. Backup copies stored in the cloud tiering have higher costs associated with storing and accessing the data in the backup copies. A policy's start time can specify the start times for creating a backup copy of an application resource, such as 12:00, 13:00, 14:00, and 15:00, for an hourly backup copy, a policy's retention policy can specify the length of time that a backup copy is retained before the backup copy is destroyed, such as a week, a month, or a year, and a policy's destination pool can include the target storage device where backup copies are stored, such as the storage array 112.

Figure 2:
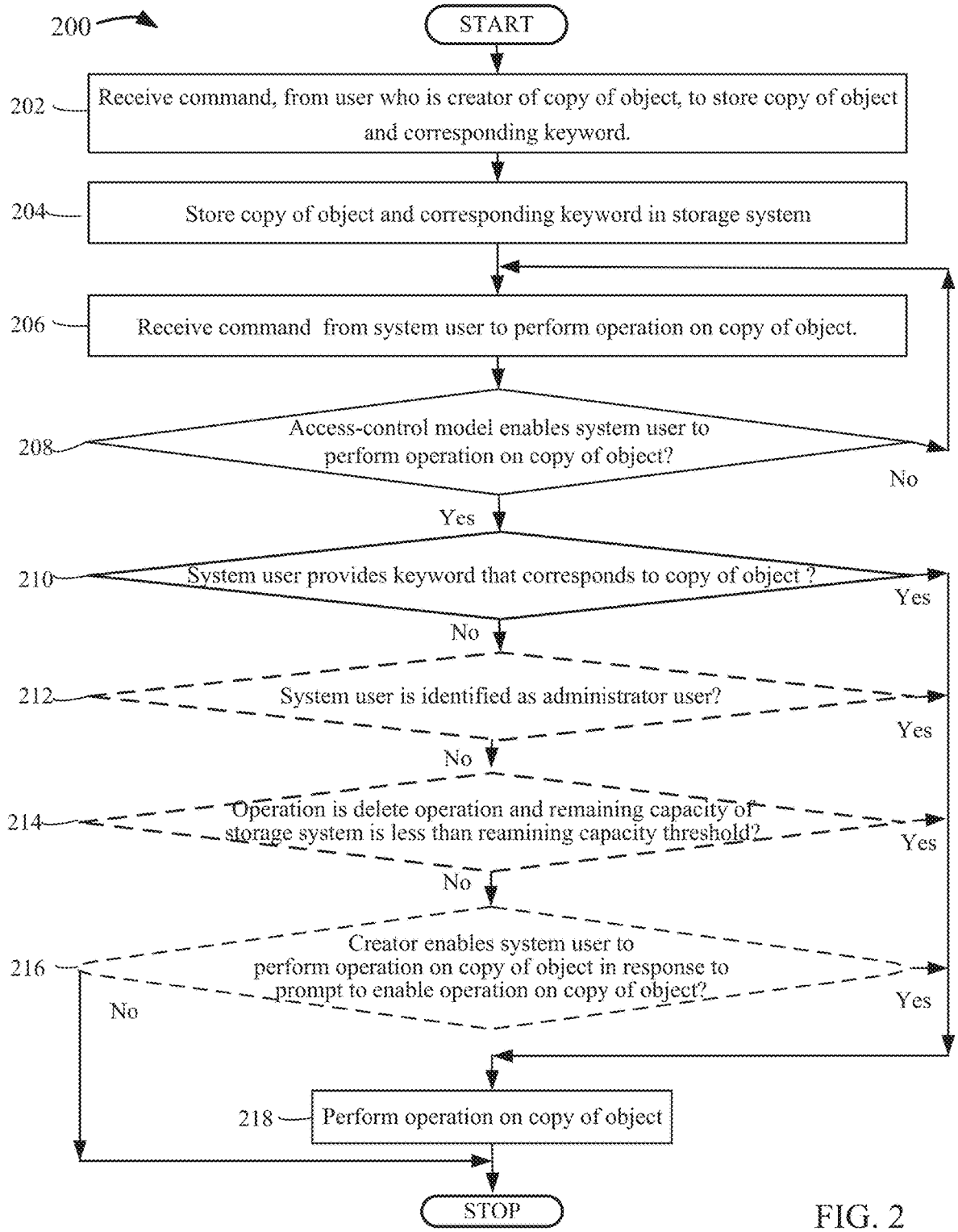
FIG. 2 is a flowchart that illustrates methods of creator-protected copies in storage systems, under an embodiment.

FIG. 2 is a flowchart that illustrates a method for creator-protected copies in storage systems, under an embodiment. Flowchart 200 depicts method acts illustrated as flowchart blocks for certain steps involved in the clients 102-108, the server 110, the storage array 112, and/or the network 122, of FIG. 1.

A command is received, from a user who is a creator of a copy of an object, to store the copy of the object and a corresponding keyword in a storage system, block 202. A system receives a user's command to create a copy of an object. For example, and without limitation, this can include the storage array 112 receiving a command from the client 102 for a system user named Chris to create a golden copy of a CRM object which stores data about a customer named KCorp, and then store the golden copy and its keyword KCorp@123 to the first disk 116 in the storage array 112. In another example, the storage array 112 receives commands from the client 102 for Chris to create the golden copies of CRM objects which store data about customers named Acme, DataBiz, and ElectroPro, and then stores these golden copies and their keywords Acme@234, DataBiz@345, and ElectroPro@456 to the first disk 116 in the storage array 112.

A creator can be a person who operates a computer and generates copies of objects. A command can be an instruction that causes a computer to perform one of its basic functions. A copy can be a duplicate of an entity. Data can be information. A keyword can be a string of characters that allows access to a copy in a computer system. A storage system can be an apparatus that retains retrievable data for a computer.

After receiving a command from a creator to store a copy of an object and its keyword, the storage system stores the copy of the object and its keyword, block 204. The system stores a copy of an object and its keyword. By way of example and without limitation, this can include the storage array 112 storing the golden copy of the KCorp CRM object and its keyword KCorp@123 in the first disk 116. In another example, the storage array 112 stores the golden copies of the Acme, DataBiz, and ElectroPro CRM objects and their keywords Acme@234, DataBiz@345, and ElectroPro@456 to the first disk 116.

Following the storing of a copy and its keyword in the storage system, a command is received from a system user to perform an operation on the copy, block 206. The system receives commands for copies of objects. In embodiments, this can include the storage array 112 receiving a command from a system user named Karen to create a snapshot of the golden copy of the KCorp CRM object. In another example, the storage array 112 receives a command from a system users named Amy to clone the golden copy of the Acme CRM object. In yet another example, the storage array 112 receives a command from a system user named Dan to delete the golden copy of the DataBiz CRM object. In an additional example, the storage array 112 receives a command from a system user named Ed to export the golden copy of the ElectroPro CRM object.

An operation can be a process in which a number, quantity, or expression is altered or manipulated according to formal rules. A system user can be a person who operates a computer.

Having received a system user's command to perform an operation on a copy of an object, a determination is made whether an access control model enables the system user to perform the operation on the copy of the object, block 208. The system uses an access control model to determine whether a system user can perform an operation on a copy. For example, and without limitation, this can include the storage array 112 using the access control model 130 to determine whether the system user named Karen has the authority to create a snapshot of the golden copy of the KCorp CRM object.

In another example, the storage array 112 uses the access control model 130 to determine whether the system user named Amy has the authority to create a clone of the golden copy of the Acme CRM object. In yet another example, the storage array 112 uses the access control model 130 to determine whether the system user named Dan has the authority to delete the golden copy of the DataBiz CRM object. In an additional example, the storage array 112 uses the access control model 130 to determine whether the system user named Ed has the authority to export a copy of the golden copy of the ElectroPro CRM object.

If a storage system determines that a system user has the authority to perform an operation on a copy of an object, the method 200 continues to block 210 to determine if the system user provide the keyword for the copy of the object specified by the operation. If the access control model determines that a system user does not have the authority to perform the operation on the copy of the object, the method 200 returns to block 206 to receive the next user's command to perform an operation on a copy of an object.

If an access control model enables a system user to perform an operation on a copy of an object in a storage system, then the system determines whether the system user provides the keyword that corresponds to the copy of the object, block 210. The system determines whether a system user provides the keyword to perform an operation on the copy specified by the system user's command. By way of example and without limitation, this can include the storage array 112 determining whether Karen provides the keyword KCorp@123 for creating a snapshot of the golden copy of the KCorp CRM object.

In another example, the storage array 112 determines whether Amy provides the keyword Acme@234 for creating a clone of the golden copy of the Acme CRM object. In yet another example, the storage array 112 determines whether Dan provides the keyword DataBiz@345 for deleting the golden copy of the DataBiz CRM object. In an additional example, the storage array 112 determines whether Ed provides the keyword ElectroPro@456 for exporting a copy of the golden copy of the ElectroPro CRM object.

If a system user provides the keyword for the copy specified by the system user's command, the method 200 proceeds to block 218 to perform the operation. If the system user does not provide the keyword for the copy specified by the system user's command, the method 200 continues to block 212 to determine if the system user is an administrator user.

If a system user did not provide a keyword for a copy specified by the system user's command, the system optionally determines if the system user is an administrator user, block 212. The system can enable an administrator user to access a copy without having provided the keyword for the copy. In embodiments, this can include the storage array 112 using the access control model 130 to determine whether the system user named Amy is an administrator user who might therefore be permitted to clone the golden copy of the Acme CRM object without having provided the keyword for this golden copy. In another example, the storage array 112 uses the access control model 130 to determine whether the system user named Dan is an administrator user who might therefore be permitted to delete the golden copy of the DataBiz CRM object without having provided the keyword for this golden copy. In yet another example, the storage array 112 uses the access control model 130 to determine whether the system user named Ed is an administrator user who might therefore be permitted to export a copy of the golden copy of the ElectroPro CRM object without having provided the keyword for this golden copy. An administrator user can be a person who is responsible for managing a computer.

If a system user is an administrator user, the method 200 proceeds to block 218 to perform the system user's operation on the specified copy. If the system user is not an administrator user, the method 200 continues to block 214 to determine if the operation specified by the system user's command is a delete operation and the remaining capacity of the storage system specified by the command is less than a remaining capacity threshold.

If a system user is not an administrator user, the system optionally determines if the operation specified by the system user's command is a delete operation and the remaining capacity of the storage system specified by the command is less than a remaining capacity threshold, block 214. The system can permit a delete operation to be performed on a copy of an object without the keyword having been provided for if the corresponding storage system is near its full storage capacity. For example, and without limitation, this can include the storage array 112 determining whether Dan's command is to delete a copy from the storage array 112 which is near its full storage capacity. In another example, the storage array 112 determines whether Ed's command is to delete a copy from the storage array 112 which is near its full storage capacity. If the operation specified by a system user's command is a delete operation and the remining capacity of the storage system specified by the command is less than a remaining capacity threshold, the method 200 proceeds to block 218 to perform the operation. If the operation specified by the system user's command is not to delete a copy or the remaining capacity of the storage system specified by the command is not less than a remaining capacity threshold, the method 200 continues to block 216 to determine if the creator who created the copy specified by the command will enable the performance of the command's operation.

A delete operation can be a process in which a number, quantity, or expression is removed according to formal rules. A remaining capacity can be the currently unused amount that something can contain. A remaining capacity threshold can be the magnitude of the currently unused amount that something can contain for a certain result or condition to occur or be manifested.

If the operation specified by the system user's command is not an operation to delete a copy or the remaining capacity of the storage system specified by the command is not less than a remaining capacity threshold, the system optionally determines if the creator who created the copy specified by the command will enable the performance of the operation, in response to being prompted to enable the performance of the operation on the copy, block 216. The system prompts the creator of a copy to decide whether to permit a system user without the keyword to perform an operation on the copy. By way of example and without limitation, this can include the storage array 112 prompting the creator Chris, who created the golden copy of ElectroPro CRM object that is specified for exporting by the system user Ed, to determine whether to enable Ed to export a copy of the golden copy of the ElectroPro CRM object from the first disk 116. Then the storage array 112 determines whether Chris enters user credentials to login to the client 106 to provide permission which enables Ed to perform the export operation on a copy of the golden copy of the ElectroPro CRM object stored in the first disk 116 in the storage array 112. If the system enables a user to perform an operation on a copy of an object specified by a command, then the method 200 continues to block 218 to perform the operation. If the system does not enable a user to perform an operation on a copy of an object specified by a command, then the method 200 terminates to become ready for processing the next command for the system 100.

If a system user provides a keyword for a copy specified by an operation, if the system user is an administrator user, if the command's operation is a delete operation and the remaining capacity of the storage system is less than a remaining capacity threshold, or if the creator of a copy responds to a prompt by enabling the performance of an operation on the copy, the storage array performs the operation, block 218. The system performs an operation on a copy associated with a command that is issued by a user. In embodiments, this can include the storage array 112 performing Karen's create snapshot operation on Chris' golden copy of the KCorp CRM object stored in the first disk 116 in the storage array 112, because Karen provided the keyword KCorp@123 for the golden copy of the KCorp CRM object.

In another example, since Amy is an administrator user, the storage array 112 performs Amy's create clone operation on Chris' golden copy of the Acme CRM object stored in the first disk 116 in the storage array 112. In yet another example, since Dan's operation is a delete operation and the remaining capacity of the storage array 112 is less than the 5% remaining capacity threshold, the storage array 112 performs Dan's delete operation on Chris' golden copy of the DataBiz CRM object stored in the first disk 116 in the storage array 112. In an additional example, since Chris responded to a prompt by enabling Ed's export operation, the storage array 112 performs Ed's export operation on a copy of Chris' golden copy of the ElectroPro CRM object stored in the first disk 116 in the storage array 112. Then method 200 terminates to be ready for processing the next command received for the storage array 112.

In environments where copy data management applications are deployed with multi-tenant/multi-users, the keyword mechanism may be used to control the operations across the tenants/users at the granularity of a given source application or a target copy. Therefore, the system 100 controls which applications perform which operations for which user in a multi-tenant environment, and which locations store other copies of the object created by the creator by providing the system user with a keyword that enables access via a source application to a target copy of the object stored on the storage system. For example, Chris, who is the creator of the golden copies of the Acme, DataBiz, ElectroPro, and KCorp CRM objects on the first disk 116 in the storage array 112, lists the first disk 116 as storing the target copies of the objects which are accessible for system users who are super administrator users who are responsible for supporting multi-tenant customers, and lists the AppSync copy data management application as a source application for performing operations on the target copies on the first disk 116 in the storage array 112.

A source application can be a program that performs a particular set of operations on copies of objects. A target copy can be specific duplicates of objects. A copy data management application can be software for an approach to reducing storage consumption that involves eliminating the unnecessary duplication of production information. A multi-tenant environment can be a software architecture in which a single instance of software executes on a server and serves multiple customers.

In environments where distinct copy data management applications are deployed, the system 100 can maintain control by using the keyword mechanism to temporarily enable access to specific copies of objects across the copy data management applications by using temporary keywords which will expire in limited time. Therefore, the system 100 enables access to copies of objects by assigning a temporary keyword, which expires in a limited time, for the copies of the objects to the system user. For example, Chris provides temporary keywords to enable temporary access by system users who typically do not have access to the golden copies 130 of the Acme, DataBiz, ElectroPro, and KCorp CRM objects stored on the first disk 116 in the storage array 112. A limited time can be a restriction on a clearly identified chronological point or duration as measured in hours and minutes, such as midnight or 15 minutes. A temporary keyword can be a string of characters that allows access for a limited time to a copy in a computer system.

In environments where the golden copy of source and the copies of the golden copies (second-generation copies in copy re-purpose use cases) are created by one user, the creator, while creating the second-generation copies is managed by different users, known as consumers, based on different use-cases, such as development operations (devops), analytics, and testing. The system 100 can control which system users perform which operations on which copies of objects created by the creator during which use-cases by providing these system users with corresponding keywords which are specific to these system users, these use cases, these operations, any primary copies of the objects, and any secondary copies of the objects. This way, the copies are protected from the consumers who are on the top of the access control list. For example, Chris, who is the creator of the golden copies 132 of the KCorp, Acme, DataBiz, and ElectroPro CRM objects on the first disk 116 and the secondary copies 136 of the golden copies 132 on the second disk 118 in the storage array 112, provides the keywords 138 for the secondary copies 136 to system users who are non-administrator users who can now access the secondary copies 136 during development operation use cases.

A use case can be a specific situation in which a product or service could potentially be used. A primary copy can be the most important version. A secondary copy can be a duplicate of the most important version.

Although FIG. 2 depicts the blocks 202-218 occurring in a specific order, the blocks 202-218 may occur in another order. In other implementations, each of the blocks 202-218 may also be executed in combination with other blocks and/or some blocks may be divided into a different set of blocks.

Figure 3:
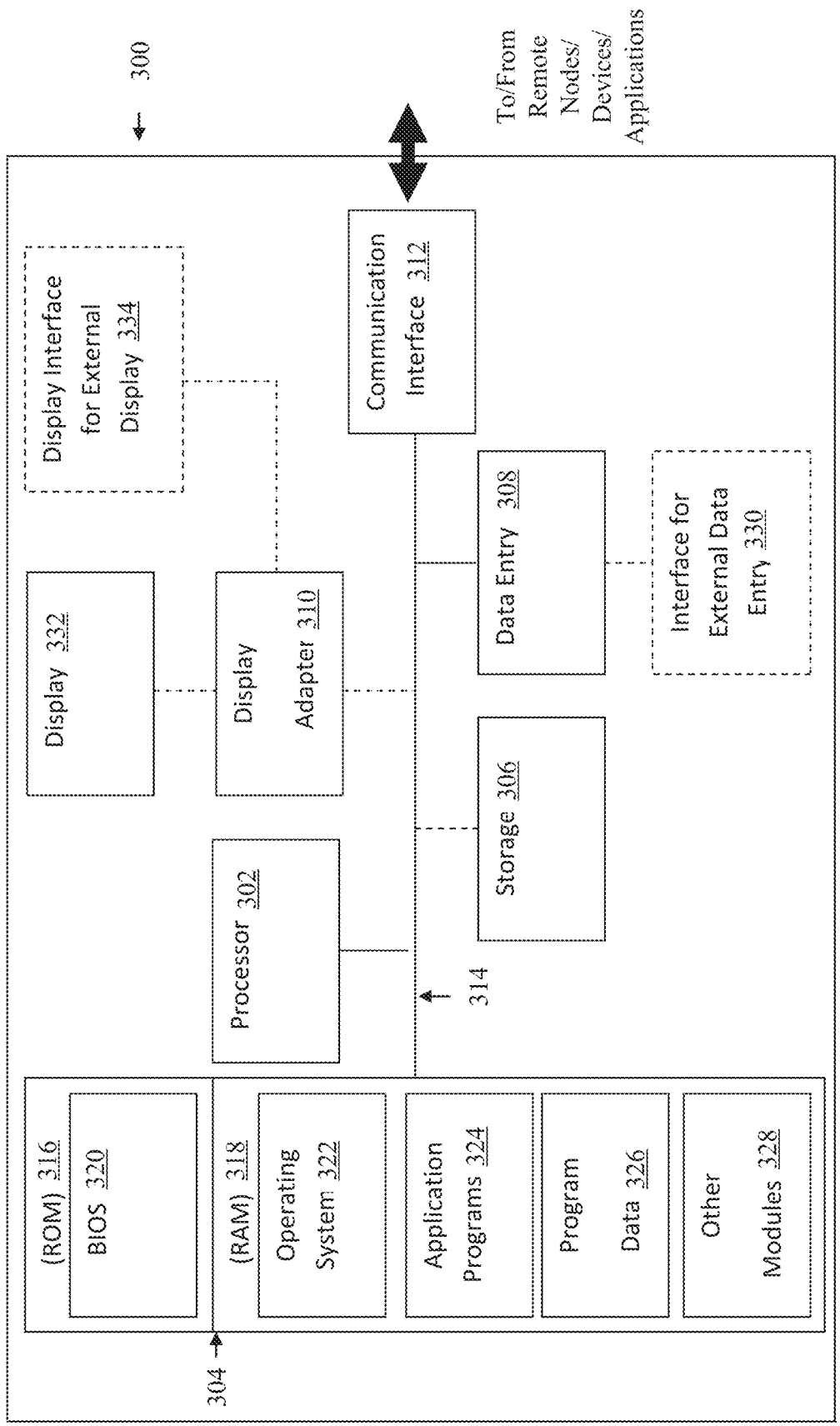
FIG. 3 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random-access memory (RAM) 318. The memory 304 may be configured to store program instructions and data during operation of the hardware device 300. In various embodiments, the memory 304 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 300. It is noted that the methods described herein may be embodied in executable instructions stored in a computer readable medium for use by or in connection with an instruction execution machine, apparatus, or device, such as a computer-based or processor-containing machine, apparatus, or device.

It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for conducting the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330.

By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device, or other common network node, and typically includes many or all the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

The arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for creator-protected copies in storage systems, comprising:
   one or more processors; and
   a non-transitory computer readable medium storing a plurality of instructions, which when executed, cause the one or more processors to:
   store a copy of an object and a corresponding keyword to a storage system, in response to receiving a command, from a user who is an explicit creator of the copy of the object and the corresponding keyword, to store the copy of the object and the corresponding keyword;
   determine whether an access control model enables a system user to perform an operation on the copy of the object, in response to receiving a command from the system user to perform the operation on the copy of the object;
   determine whether the system user provides a copy of the corresponding keyword that was explicitly created by and subsequently provided by the creator of the copy of the object, and that corresponds to the copy of the object, in response to a determination that the access control model enables the system user to perform the operation on the copy of the object;
   perform the operation on the copy of the object, in response to a determination that the system user provides the copy of the corresponding keyword that was explicitly created by and subsequently provided by the creator of the copy of the object, and that corresponds to the copy of the object; and
   prompt the creator of the copy of the object to enable the system user to perform the operation on the copy of the object, in response to a determination that the system user failed to provide a copy of the keyword.

2. The system of claim 1, wherein performing the operation on the copy of the object in the storage system is also in response to determining that the system user is an administrator user.

3. The system of claim 1, wherein performing the operation on the copy of the object is also in response to determining that the operation is a delete operation and a remaining capacity of the storage system is less than a remaining capacity threshold.

4. The system of claim 1, wherein the plurality of instructions further cause the one or more processors to perform the operation on the copy of the object in response to a determination that the creator has enabled the system user to perform the operation on the copy of the object in response to the prompt.

5. The system of claim 1, wherein which applications perform which operations for which user in a multi-tenant environment, and which locations store other copies of the object created by the creator are controlled by providing the system user with a keyword that enables access via a source application to a target copy of the object stored on the storage system.

6. The system of claim 1, wherein access is enabled to copies of objects via a copy data management application by assigning a temporary keyword, which expires in a limited time, for the copies of the objects to the system user.

7. The system of claim 1, wherein which system users perform which operations on which copies of objects created by the creator during which use-cases are controlled by providing these system users with corresponding keywords which are specific to these system users, these use cases, these operations, any primary copies of the objects, and any secondary copies of the objects.

8. A computer-implemented method for creator-protected copies in storage systems
storing a copy of an object and a corresponding keyword to a storage system, in response to receiving a command, from a user who is an explicit creator of the copy of the object and the corresponding keyword, to store the copy of the object and the corresponding keyword;
determining whether an access control model enables a system user to perform an operation on the copy of the object, in response to receiving a command from the system user to perform the operation on the copy of the object;
determining whether the system user provides a copy of the corresponding keyword that was explicitly created by and subsequently provided by the creator of the copy of the object, and that corresponds to the copy of the object, in response to a determination that the access control model enables the system user to perform the operation on the copy of the object;
performing the operation on the copy of the object, in response to a determination that the system user provides the copy of the corresponding keyword that was explicitly created by and subsequently provided by the creator of the copy of the object, and that corresponds to the copy of the object; and
prompting the creator of the copy of the object to enable the system user to perform the operation on the copy of the object, in response to a determination that the system user failed to provide a copy of the keyword.

9. The computer-implemented method of claim 8, wherein performing the operation on the copy of the object in the storage system is also in response to determining that the system user is an administrator user.

10. The computer-implemented method of claim 8, wherein performing the operation on the copy of the object is also in response to determining that the operation is a delete operation and a remaining capacity of the storage system is less than a remaining capacity threshold.

11. The computer-implemented method of claim 8, wherein performing the operation on the copy of the object is also in response to determining that the creator enables the system user to perform the operation on the copy of the object in response to a prompt to enable the system user to perform the operation on the copy of the object.

12. The computer-implemented method of claim 8, wherein which applications perform which operations for which user in a multi-tenant environment, and which locations store other copies of the object created by the creator are controlled by providing the system user with a keyword that enables access via a source application to a target copy of the object stored on the storage system.

13. The computer-implemented method of claim 8, wherein access is enabled to copies of objects via a copy data management application by assigning a temporary keyword, which expires in a limited time, for the copies of the objects to the system user.

14. The computer-implemented method of claim 8, wherein which system users perform which operations on which copies of objects created by the creator during which use-cases are controlled by providing these system users with corresponding keywords which are specific to these system users, these use cases, these operations, any primary copies of the objects, and any secondary copies of the objects.

15. A computer program product, comprising a non-transitory computer-readable medium having a computer-readable program code embodied therein to be executed by one or more processors, the program code including instructions to:
store a copy of an object and a corresponding keyword to a storage system, in response to receiving a command, from a user who is an explicit creator of the copy of the object and the corresponding keyword, to store the copy of the object and the corresponding keyword;
determine whether an access control model enables a system user to perform an operation on the copy of the object, in response to receiving a command from the system user to perform the operation on the copy of the object;
determine whether the system user provides a copy of the corresponding keyword that was explicitly created by and subsequently provided by the creator of the copy of the object, and that corresponds to the copy of the object, in response to a determination that the access control model enables the system user to perform the operation on the copy of the object;
perform the operation on the copy of the object, in response to a determination that the system user provides the copy of the corresponding keyword that was explicitly created by and subsequently provided by the creator of the copy of the object, and that corresponds to the copy of the object; and
prompt the creator of the copy of the object to enable the system user to perform the operation on the copy of the object, in response to a determination that the system user failed to provide a copy of the keyword.

16. The computer program product of claim 15, wherein performing the operation on the copy of the object in the storage system is also in response to determining that the system user is an administrator user.

17. The computer program product of claim 15, wherein performing the operation on the copy of the object is also in response to determining that the operation is a delete operation and a remaining capacity of the storage system is less than a remaining capacity threshold.

18. The computer program product of claim 15, wherein performing the operation on the copy of the object is also in response to determining that the creator enables the system user to perform the operation on the copy of the object in response to a prompt to enable the system user to perform the operation on the copy of the object.

19. The computer program product of claim 15, wherein which applications perform which operations for which user in a multi-tenant environment, and which locations store other copies of the object created by the creator are controlled by providing the system user with a keyword that enables access via a source application to a target copy of the object stored on the storage system.

20. The computer program product of claim 15, wherein access is enabled to copies of objects via a copy data management application by assigning a temporary keyword, which expires in a limited time, for the copies of the objects to the system user, and which system users perform which operations on which copies of objects created by the creator during which use-cases are controlled by providing these system users with corresponding keywords which are specific to these system users, these use cases, these operations, any primary copies of the objects, and any secondary copies of the objects.

* * * * *